Oct. 21, 1969     M. J. GORDON ET AL     3,474,024
ELECTROKINETIC DEMONSTRATION CELL CONSTRUCTION
Filed Aug. 1, 1966

INVENTORS
MANUEL J. GORDON
BY DAVID G. OGLE

ATTORNEYS

3,474,024
ELECTROKINETIC DEMONSTRATION CELL CONSTRUCTION

Manuel J. Gordon, Palo Alto, and David G. Ogle, Sunnyvale, Calif., assignors to Beckman Instruments, Inc., a corporation of California
Filed Aug. 1, 1966, Ser. No. 569,260
Int. Cl. B01k 5/00
U.S. Cl. 204—299                        3 Claims

ABSTRACT OF THE DISCLOSURE

A cell for visually demonstrating electrokinetic phenomena including two L-shaped transparent sections each having an upwardly extending channel portion and a transversely extending channel portion joined together to form a continuous U-shaped channel, a readily removable pervious membrane sandwiched between the L-shaped sections across the transversely extending channel portions, and an electrode disposed in contact with the liquid in each of the upwardly extending portions of the channel.

---

This invention relates to a cell construction for demonstration of electrokinetic phenomena adapted to rapidly and visually illustrate electrophoresis, electroendosmosis, and streaming potentials.

It is a general object of the present invention to provide a teaching aid which serves to rapidly and visually illustrate various electrokinetic phenomena.

It is another object of the present invention to provide apparatus of the kind described wherein a series of demonstrations can be quickly carried out and wherein the usual bubble formation associated with immersed electrodes shall not interfere.

These and other objects of the invention shall become more readily apparent from the following detailed description of a preferred embodiment according to the invention when considered in conjunction with the accompanying drawings, in which.

Figure 2:
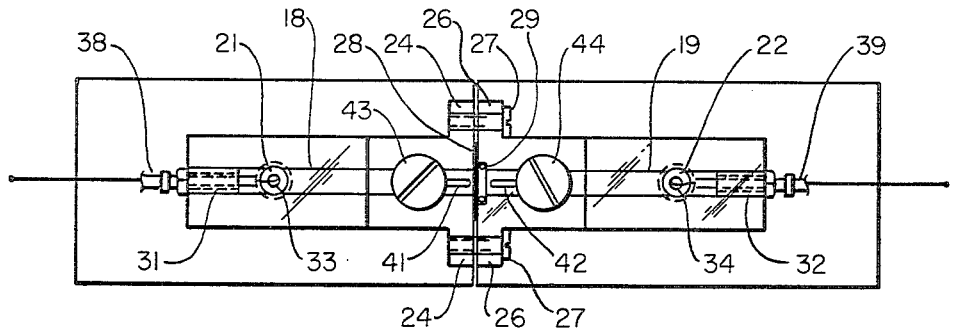
FIGURE 2 is a plan view of FIGURE 1.

In general, there is provided herein a cell construction for demonstration of electrokinetic phenomena comprising a U-shaped channel formed in a transparent structure. Thus, the contents of the channel may be visually inspected due to the transparent walls thereof. The channel is open at each end for filling with a buffered electrolyte or other liquid. A pervious membrane forms a readily removable partition across the transversely extending portion of the channel. The electrodes are disposed and adapted to contact the liquid in the upstanding portions of the channel respectively on opposite sides of the membrane. Finally, the electrodes are disposed at a level substantially above the partition formed by the membrane so that any bubbles formed along the electrodes will not enter the transversely extending portion of the channel. Further, it is preferred to have a bleed opening extending upwardly from adjacent each side of the membrane partition. The bleed openings may be selectively vented or sealed so as to remove any bubbles from the transversely extending portion of the U-shaped channel and particularly from the region immediately adjacent the membrane partition.

The foregoing general arrangement has been provided in particular detail as now to be described with respect to the drawings. Each of a pair of L-shaped blocks 11, 12 of transparent material is mounted upon a base 13, 14, respectively, for supporting the blocks 11, 12 in an upstanding position. Each block 11, 12 is bored vertically with an upwardly extending channel portion 16, 17, respectively, and a transversely extending channel portion 18, 19. The upper ends 21, 22 of portions 16, 17 are generally open and adapted to receive a buffered electrolyte or other liquid therethrough so as to fill the U-shaped channel formed by portions 16–19. Ends 21, 22 are threaded and adapted to receive a Luer fitting 23 for purposes which will be described further below.

Blocks 11, 12 include outwardly extending flanges 24, 26 threaded to receive four screws 27 which serve to align and couple the ends of channel portions 18, 19. Before joining the separable halves of the construction, a pervious membrane 28 of suitable material such as cellulose-acetate can be captured at the interface between blocks 11 and 12 to form a readily removable partition between volumes of fluid on each side of membrane 28. An O-ring 29 carried around one end of channel portion 19 serves to form a seal at the interface between blocks 11 and 12. O-ring 29, therefore, presses against membrane 28 when screws 27 have been taken up sufficiently to compress the two ends of blocks 11, 12 together.

Means for applying an electric potential to liquid in the U-shaped channel includes the pair of connectors 31, 32 which are embedded to extend into the sides of blocks 11, 12, respectively. Connectors 31, 32 are of a conventional type such as a conventional phone jack style connection adapted to receive an electrical probe therein. Each connector 31, 32 includes a short length of wire 33, 34, respectively, which is preferably of a chemically inert material such as platinum. These platinum wires (33, 34) are preferably platinized (i.e., electrolytically coated with "platinum black") to minimize the effects of electrode polarization and the ensuing bubble formation. Electrodes 33, 34 are, therefore, disposed and adapted to contact liquid in the upstanding channel portions 16, 17, respectively, on opposite sides of membrane 28. It is noted that the electrodes 33, 34 are disposed at a level substantially above the partition formed by membrane 28. Thus, when the U-shaped channel is filled with a buffered electrolyte and a potential applied to electrodes 33, 34, any bubbles which might be formed at the interface between the electrolyte and electrodes 33 or 34 will rise immediately to the surface and not become entrapped in the transversely extending channel portions 18, 19. A suitable potential can, of course, be applied between electrodes 33, 34 by means of a battery 36, and switch 37 coupled to probes 38, 39 inserted into connectors 31, 32.

When the buffered electrolyte is poured into ends 21, 22, air can become entrapped in the transversely extending channel portions 18, 19. Accordingly, means for bleeding off any such entrapped gas is provided by bleed openings 41, 42 which may be selectively vented or sealed by machine screws 43, 44 which are threadedly engaged in the upper ends of the bleed openings 41, 42. Resilient O-rings 46 are interposed between the underside of the head of each screw 43, 44 and the upper surface of blocks 11, 12, respectively.

Figure 1:
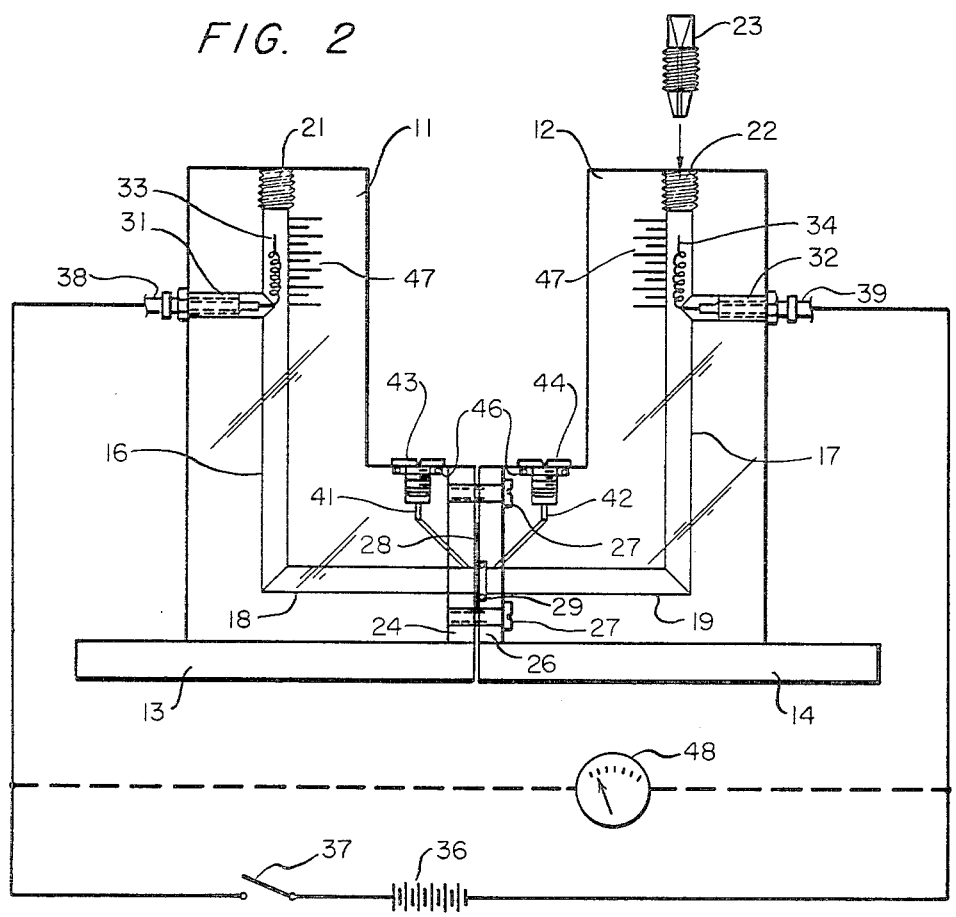
FIGURE 1 is a front elevation view, showing the invention.

Operation of the device in demonstrating electrophoresis proceeds as follows:

Membrane 28 is first removed so as to provide a free-flow between channel portions 18 and 19. A buffered electrolyte is poured into the open end 21 or 22 of the U-shaped channel until electrodes 33, 34 are contacted by the liquid. Inasmuch as the electrode 33 constittues the anode, as shown in FIGURE 1, dyed cellulose-acetate particles or colored resin beads are carefully layered on top of channel portion 16. Switch 37 is then closed and migration of colored particles will be observed from channel portion 16 over to channel portion 17.

For demonstrating electroendosmosis, membrane 28 is wetted with a buffered electrolyte and then inserted between the two halves of the device. Each upstanding channel portion 16, 17 is filled with a buffered electrolyte to the same height and these heights are noted. Switch 37 is then closed to apply a potential to the liquid which will cause the liquid level on one side to rise an equal amount to the decrease in liquid level on the other side. Thus, it will be readily illustrated and apparent that fluid has moved through the membrane 28. By using a scale such as scales 47, the velocity of fluid movement can be calculated.

For demonstrating streaming potentials, membrane 28 is again wetted with the buffered electrolyte and inserted in place. Each channel of the cell is filled with buffered electrolyte to roughly half its height. Subsequently, a Luer fitting 23 is screwed into the upper end of one of channel portions 16, 17. A hypodermic syringe filled with buffered electrolyte is then attached to the Luer fitting and a millivolt meter 48 is connected across electrodes 33, 34 while switch 37 remains open. The syringe is then depressed to force liquid through membrane 28, and it will then be noted on millivolt meter 48 that a potential is generated by the flow of fluid through membrane 28.

From the foregoing, it will be readily evident that there has been provided an improved teaching aid for demonstrating electrokinetic phenomena wherein a number of demonstrations can be accomplished in a relatively short span of time compared to the usual time required for carrying out such phenomena.

We claim:

1. A cell for visually demonstrating electrokinetic phenomena comprising:
   two L-shaped transparent sections each having an upwardly extending channel portion and a transversely extending channel portion;
   means for joining said L-shaped sections together to form a continuous U-shaped channel;
   said U-shaped channel being open at each end thereof for filling the channel with liquid;
   a readily removable pervious membrane sandwiched between said L-shaped sections across said transversely extending channel portions;
   an electrode disposed in each of said upwardly extending channel portions and adapted to be in contact with the liquid with the lowermost portion of each electrode being located at a level substantially above said pervious membrane;
   means for applying an electrical potential between said electrodes;
   a pair of upwardly extending bleed openings, each bleed opening communicating with one transversely extending channel portion adjacent to said pervious membrane; and
   means for selectively venting or sealing each of said bleed openings to remove gas bubbles from the liquid contained in the U-shaped channel.

2. A cell as defined in claim 1 comprising in addition resilient sealing means disposed about one of said transversely extending channel portions adjacent to said pervious membrane to form a liquid-tight seal between said L-shaped sections.

3. A cell as defined in claim 1 wherein said means for applying an electrical potential is connected to electrodes through the side walls of said L-shaped sections.

References Cited

UNITED STATES PATENTS

| 2,412,602 | 12/1946 | Chambers et al. | 204—180 |
| 2,636,851 | 4/1953 | Juda et al. | |
| 2,678,300 | 5/1954 | Sturtevant | 204—299 |
| 2,752,306 | 6/1956 | Juda et al. | |
| 2,762,254 | 9/1956 | Kegeles | 204—299 |
| 3,297,595 | 1/1967 | Mindick et al. | |

OTHER REFERENCES

Kendall et al.: "The Separation of Isotopes, Proceedings National Academy of Sciences," vol. 9, 1923, pp. 75–78.

Rohm & Haas Company, "Amberplex Ion Permeable Membranes," 1952, pp. 14–19.

JOHN H. MACK, Primary Examiner

E. ZAGARELLA, JR., Assistant Examiner

U.S. Cl. X.R.

204—180; 301